US006483470B1

(12) United States Patent
Hohnstein et al.

(10) Patent No.: US 6,483,470 B1
(45) Date of Patent: Nov. 19, 2002

(54) POWER SUPPLY FOR A LIGHT POLE MOUNTED WIRELESS ANTENNA

(75) Inventors: Donald L. Hohnstein, Greeley; Charles I. Cook; Guy M. Wells, both of Louisville; Angus O. Dougherty, Westminster, all of CO (US)

(73) Assignee: Qwest Communications International, Inc., Denver, CO (US)

( * ) Notice: Subject to any disclaimer, the term of this patent is extended or adjusted under 35 U.S.C. 154(b) by 5 days.

(21) Appl. No.: 09/658,310

(22) Filed: Sep. 8, 2000

(Under 37 CFR 1.47)

Related U.S. Application Data

(60) Provisional application No. 60/152,730, filed on Sep. 8, 1999, and provisional application No. 60/185,788, filed on Feb. 29, 2000.

(51) Int. Cl.[7] .............................. H01Q 1/12; H01H 47/24
(52) U.S. Cl. ...................... 343/721; 343/890; 361/175
(58) Field of Search ................................. 343/721, 874, 343/720, 878, 890, 879, 891, 892; 361/175; 323/237, 351

(56) References Cited

U.S. PATENT DOCUMENTS

| | | | |
|---|---|---|---|
| 4,317,229 A | | 2/1982 | Craig et al. .................. 455/277 |
| 5,068,916 A | | 11/1991 | Harrison et al. ............... 455/39 |
| 5,150,473 A | | 9/1992 | Zulch ......................... 395/425 |
| 5,195,016 A | * | 3/1993 | Powers ........................ 361/175 |
| 5,257,257 A | | 10/1993 | Chen et al. .................... 370/18 |
| 5,315,584 A | | 5/1994 | Savary et al. .................. 370/18 |
| 5,341,395 A | | 8/1994 | Bi ................................. 375/1 |
| 5,353,300 A | | 10/1994 | Lee et al. ........................ 375/1 |
| 5,390,170 A | | 2/1995 | Sawant et al. ............. 370/58.1 |
| 5,406,550 A | | 4/1995 | McTiffin ....................... 370/18 |

(List continued on next page.)

FOREIGN PATENT DOCUMENTS

| | | |
|---|---|---|
| WO | WO 97/29605 | 8/1997 |
| WO | WO 97/36405 | 10/1997 |
| WO | WO 97/48210 | 12/1997 |
| WO | WO 98/09440 | 3/1998 |
| WO | WO 98/26548 | 6/1998 |

OTHER PUBLICATIONS

Access NGI, WAN Access Switch FVC.COM, 1999.
Fumijuki Adachi et al., Wideband DS–CDMA for Next–Generation Mobile Communications Systems, IEEE Communications Magazine, Sep. 1998, Vo. 36, No. 9, pp. 56–69.
Malcolm W. Oliphant, The Mobile Phone Meets the Internet, IEEE Spectrum, Aug. 1999, pp. 20–28.
David Goodman of Rutgers University, "Wireless Information Networks" Handouts, presented at U S West on Mar. 17–19, 1993.
Bo Ryo et al., Managing IP Services over a PACS Packet Network, IEEE Network, Jul./Aug. 1998, pp. 4–10.

(List continued on next page.)

*Primary Examiner*—Tho Phan
*Assistant Examiner*—James Clinger
(74) *Attorney, Agent, or Firm*—Townsend and Townsend and Crew, LLP

(57) ABSTRACT

The present invention provides electrical power to wireless communication antenna systems by tapping into the electrical circuit used to power outdoor elevated lighting systems. The connection is made by interrupting the lighting circuit at the electric eye or photocell. A power adapter is inserted between the electric eye and the light circuit. Cabling is used to interconnect the power adapter and an antenna module mounted to the light pole.

20 Claims, 12 Drawing Sheets

U.S. PATENT DOCUMENTS

| | | | |
|---|---|---|---|
| 5,408,237 A | 4/1995 | Patterson et al. | 342/354 |
| 5,410,568 A | 4/1995 | Schilling | 375/205 |
| 5,461,610 A | 10/1995 | Weerackody | 370/18 |
| 5,473,602 A | 12/1995 | McKenna et al. | 370/60 |
| 5,479,400 A | 12/1995 | Dilworth et al. | 370/60 |
| 5,504,744 A | 4/1996 | Adams et al. | 370/60.1 |
| 5,513,183 A | 4/1996 | Kay et al. | 370/95.3 |
| 5,517,617 A | 5/1996 | Sathaye et al. | 395/200.1 |
| 5,572,528 A | 11/1996 | Shuen | 370/85.13 |
| 5,590,133 A | 12/1996 | Billstrom et al. | 370/349 |
| 5,641,141 A | 6/1997 | Goodwin | 248/218.4 |
| 5,646,635 A | 7/1997 | Cockson et al. | 343/702 |
| 5,673,263 A | 9/1997 | Basso et al. | 370/396 |
| 5,708,659 A | 1/1998 | Rostoker et al. | 370/392 |
| 5,715,250 A | 2/1998 | Watanabe | 370/395 |
| 5,726,984 A | 3/1998 | Kubler et al. | 370/349 |
| 5,737,333 A | 4/1998 | Civanlar et al. | 370/352 |
| 5,761,195 A | 6/1998 | Lu et al. | 370/329 |
| 5,764,645 A | 6/1998 | Bernet et al. | 370/466 |
| 5,793,758 A | 8/1998 | Penners | 370/342 |
| 5,809,415 A | 9/1998 | Rossmann | 455/422 |
| 5,819,182 A | 10/1998 | Gardner et al. | 370/342 |
| 5,825,759 A | 10/1998 | Liu | 370/331 |
| 5,828,844 A | 10/1998 | Civanlar et al. | 395/200.58 |
| 5,886,738 A | 3/1999 | Hollenbeck | 348/151 |
| 5,889,770 A | 3/1999 | Jokiaho et al. | 370/337 |
| 5,894,478 A | 4/1999 | Barzegar et al. | 370/401 |
| 5,896,369 A | 4/1999 | Warsta et al. | 370/338 |
| 5,898,904 A | 4/1999 | Wang | 455/31.3 |
| 5,903,559 A | 5/1999 | Acharya et al. | 370/355 |
| 5,907,555 A | 5/1999 | Raith | 370/468 |
| 5,907,816 A | 5/1999 | Newman et al. | 455/562 |
| 5,909,430 A | 6/1999 | Reaves | 370/254 |
| 5,930,247 A | 7/1999 | Miller, II et al. | 370/395 |
| 5,935,209 A | 8/1999 | Budhraja et al. | 395/200.53 |
| 5,936,754 A | 8/1999 | Ariyavistakul | 359/145 |
| 5,943,321 A | 8/1999 | St-Hilaire et al. | 370/259 |
| 5,958,018 A | 9/1999 | Eng et al. | 709/246 |
| 5,963,178 A | 10/1999 | Jones | 343/890 |
| 5,970,406 A | 10/1999 | Komara | 455/422 |
| 6,009,096 A | 12/1999 | Jaisingh et al. | 370/395 |
| 6,009,097 A | 12/1999 | Han | 370/395 |
| 6,021,263 A | 2/2000 | Kujoory et al. | 395/200.62 |
| 6,069,592 A | 5/2000 | Wass | 343/895 |
| 6,091,788 A | 7/2000 | Keskitalo et al. | 375/347 |
| 6,222,503 B1 * | 4/2001 | Gietema et al. | 343/890 |

OTHER PUBLICATIONS

Danny Cohen et al., IP Addressing and Routing in a Local Wireless Network, IEEE INFOCOM '92, Jun. 1992, Vo. 2, pp. 626–632.

Anthony R. Noerpel et al, PACS: Personal Access Communications System—A Tutorial, IEEE Personal Communications, Jun. 1996, pp. 32–43.

Farook Khan et al., Multilevel Channel Assignment (MCA) for Wireless Personal Communications, IEEE, Apr. 5, 1997, pp. 1258–1262.

Eliminates Anarchy at the Internet Access Point and Improves Performance!, NetRoad TrafficWARE product information sheet by Ukiah Software, Inc., 1997.

Ralph Droms, Automated Configuration of TCP/IP with DHCP, IEEE Internet Computing, Jul.–Aug. 1999, pp. 45–53.

Product Catalog, Twist–Lock Photoelectric Controls 282 Series, www.fisherpierce/com.282.htm, pp. 1–2.

* cited by examiner

POWER SUPPLY FOR A LIGHT POLE MOUNTED WIRELESS ANTENNA

CROSS-REFERENCE TO RELATED APPLICATIONS

This application claims the benefit of U.S. Provisional Application No. 60/152,730 filed Sep. 8, 1999, titled "Cellularized Packetized Voice and Data," the specification of which is expressly incorporated herein by reference in its entirety. This application claims the benefit of a U.S. Provisional Application No. 60/185,788 filed Feb. 29, 2000, titled "High Speed Distributed Wireless Communication," the specification of which is expressly incorporated herein by reference in its entirety.

TECHNICAL FIELD

The present invention relates to providing electrical power to antennas and support electronics mounted on poles.

BACKGROUND ART

Wireless systems, such as PCS and cellular systems, typically include a centralized mobile switching center (MSC) responsible for call routing, user location tracking, billing information, and connectivity with other communication systems. The MSC is connected to base station controllers (BSCs), each of which supports one or more base transceiver stations (BTSs). Each BTS supports one or more cells or cell sectors based on the number and configuration of antennas supported by the BTS. A customer communicates with the wireless system through a wireless unit, such as a radio telephone, when the telephone is within the coverage range of a cell. When a call is placed, a circuit-switched connection is established from the telephone, through the BTS and BSC, to the MSC. The MSC determines the destination and, if the destination is to another telephone within the wireless system, establishes a circuit-switched connection to the destination telephone. If the destination is outside of the wireless system, the MSC routes the call to a service provider for the outside destination.

A key component in any wireless communication system is the antenna forming the edge contact between wireless subscribers and the remaining system. Wireless communication antennas are usually elevated to provide increased coverage range. Often, existing structures such as buildings, towers, utility poles, light poles, and the like provide the necessary elevation. Directional antennas are often used to form coverage areas or sectors. Multiple antennas can then be located at one site to provide geographic multiplexing.

When a new antenna location is established, various electrical connections with the antennas must be made. One type of connection carries signals between the antennas and associated transceivers. If transceivers are mounted with the antennas, power cabling and cabling for interconnection with the supporting base station must be provided. This cabling is typically run from the elevated antenna location to pedestals or boxes located on the ground or near the bottom of a pole or tower supporting the antenna. The box provides a convenient location for making power and signal connections. However, the additional work required to mount the box and connect the cabling adds significant cost to the installation of wireless antennas. Such permanent fixtures also make responding to changing communication needs difficult and expensive.

What is needed is to reduce the cabling requirements of wireless antenna installations. A significant component in any wireless antenna installation is providing electrical power to antenna support electronics. The ability to install wireless communication antenna systems without dropping power cabling to boxes or pedestals at the base of the antenna mounting structure would reduce installation costs and permit the antenna systems to be more easily relocated to meet changing communication system requirements.

DISCLOSURE OF INVENTION

The present invention provides electrical power to wireless communication antenna systems by tapping into the electrical circuit used to power outdoor elevated lighting systems. These systems include lights mounted on poles, towers or the side of buildings used to illuminate streets, parking lots, playing fields, yards, and a wide variety of outdoor spaces. For brevity, such lighting systems will be called pole mounted street lights. The power connection is made by interrupting the lighting circuit at the electric eye or photocell. Since most electric eyes can be easily removed for replacement, this interruption can typically be accomplished without disturbing the wiring for the light.

In accordance with the present invention, a wireless communication antenna system mounted on a light pole is provided. The light pole supports at least one light driven by a light circuit having an electric eye. The system includes a power adapter between the electric eye and the light circuit. An antenna module is mounted to the pole. At least one electrical cable interconnects the power adapter and the antenna module.

In an embodiment of the present invention, a charge/discharge circuit is connected by electrical cabling between the power adapter and the antenna module. The charge/discharge circuit includes at least one electrical storage device.

In another embodiment of the present invention, the antenna module includes at least one access antenna communicating with subscriber units and at least one backhaul antenna. If more than one backhaul antenna is included, the antenna module further has a packet switch routing information between the backhaul antennas and access antennas. The access antennas may include at least one omnidirectional or directional radio antenna. The antenna module may also include a repeater antenna.

A method of supplying power to a pole mounted antenna module is also provided. Current is drawn from a power adapter inserted between an electric eye and the remaining light circuit controlled by the electric eye.

A method for installing a pole mounted antenna module is also provided. The antenna module is mounted at an elevated location along the pole. A power adapter is inserted between the electric eye and the remainder of the light circuit. The power adapter and the antenna module are interconnected to power the antenna module.

A wireless communication system interconnecting a plurality of wireless subscriber units is also provided. The wireless communication system has a plurality of access points with access antennas for establishing wireless links with subscriber units. At least one access point has an antenna module with at least one access antenna. The antenna module is mounted on a light pole supporting at least one light driven by a light circuit, the light circuit controlled by an electric eye. A power adapter is disposed between the electric eye and the light circuit. At least one electrical cable interconnects the power adapter and the antenna module to provide electrical power to the antenna module.

The above objects and features as well as other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
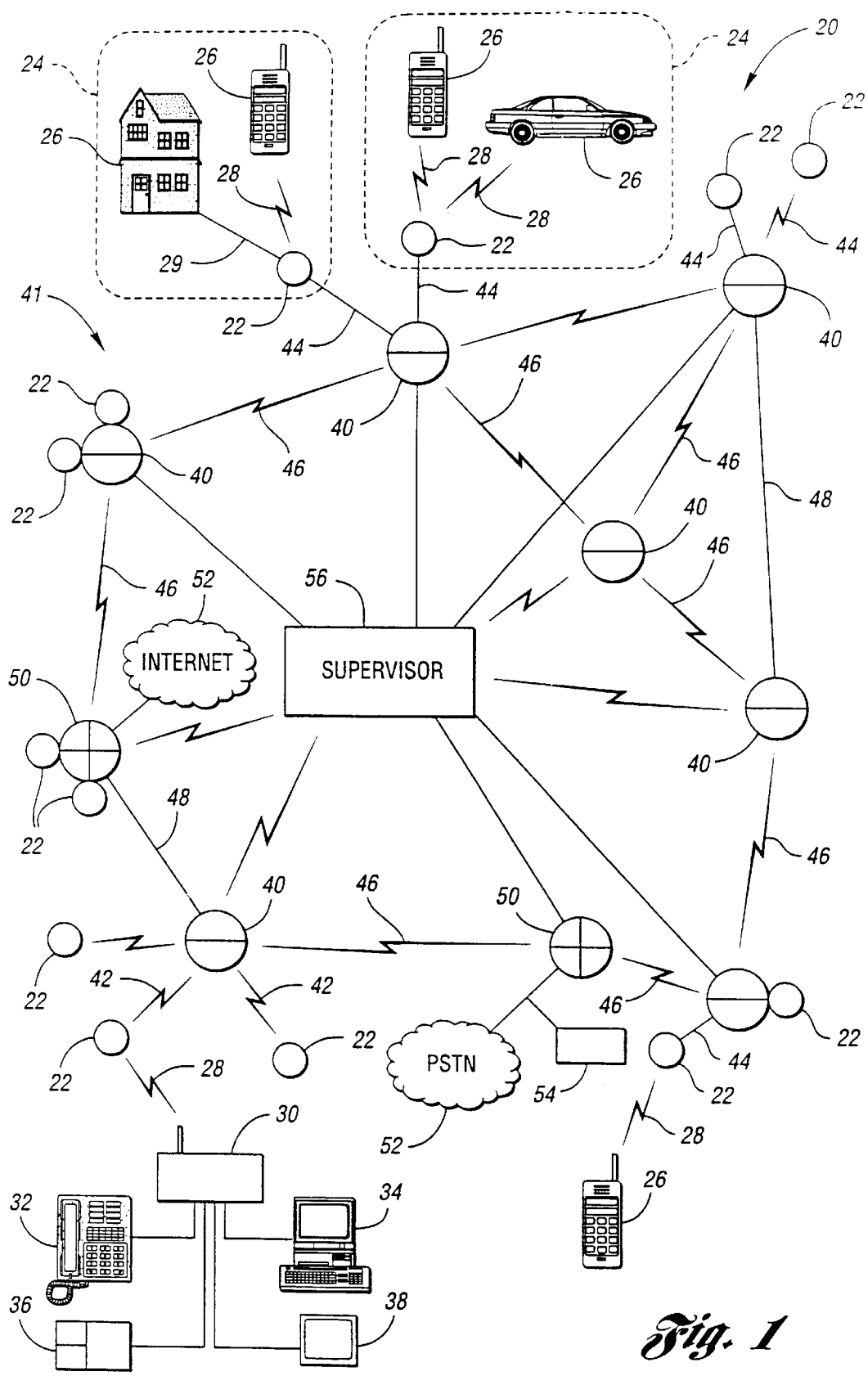
FIG. 1 is a schematic drawing illustrating a portion of a communication system according to an embodiment of the present invention.

Referring to FIG. 1, a schematic drawing illustrating a portion of a communication system according to an embodiment of the present invention is shown. A communication system, shown generally by 20, includes a plurality of access points 22 which may be, for example, a local radio access point (LRAP). Each access point 22 defines coverage area 24 such as, for example, a cell, covering a reception range of access point 22. Coverage area 24 may be formed from many independent sectors, as may result if access point 22 uses many directional antennas, or may be a single region resulting from the use of an omnidirectional antenna. Subscriber unit 26 within coverage area 24 may establish two-way wireless link 28 with access point 22. Subscriber unit 26 may also establish wireline link 29 with access point 22. Links 28, 29 may be symmetrical or asymmetrical. Subscriber unit 26 may be fixed or non-fixed and, if non-fixed, may posses varying degrees of portability and mobility. Subscriber unit 26 may be a mobile telephone, a computer, a video receiver, an audio receiver, a two-way video conferencing station, a video game, an information kiosk, a remote sensor, a remote actuator, or any other suitable communication device.

Wireless link 28 may be any form of electromagnetic signaling not confined to a wire or cable, including energy radiated by antenna as well as visible and invisible light. As will be appreciated by one of ordinary skill in the art, wireless link 28 may be implemented by any access technology, including CDMA, TDMA, FDMA, OFDM, analog, and the like. Modulation techniques that may be used with the present invention include FSK, BPSK, QPSK, m-ary QAM, FM, AM, and the like. Further, the invention does not depend on modulation frequency or on the use of FDD or TDD. In a preferred embodiment, the access technology, frequency, and modulation method for establishing wireless link 28 are based, in part, on local geography, local regulations, noise and distortion sources, other operating wireless systems, cost, or any other suitable parameter. Subscriber unit 26 and access point 22 may establish wireless link 28 using a plurality of combinations of access technology, frequency, and modulation techniques.

Information transmitted on links 28, 29 may represent voice, data, video, streaming audio, streaming video, or the like. Types of information include speech, facsimile, computer data, entertainment and informational audio and video, video game data, telemetry information, security information, and the like. If the information occurs as a continuous stream, subscriber unit 26 breaks the information into packets prior to packet transmission and reassembles the information stream from packets after packet reception. Any type of information that exists in packets or that may be packetized can be used with the present invention.

In an embodiment of the present invention, subscriber unit 26 may be implemented as part of terminal network controller 30 accepting inputs from and providing outputs to information sources including voice equipment 32, computing equipment 34, telemetry equipment 36, video equipment 38, or any other suitable communication equipment. Inputs to terminal network controller 30 may include serial data, parallel data, ISDN, standard telephone, xDSL, SR 1394, coaxial cable, twisted pair cable, optical fiber, or any other suitable communication protocol, method, or medium.

In an embodiment of the present invention, a quality error bit rate is established for each subscriber unit 26. This quality error bit rate may be based on the location of subscriber unit 26 within communication system 20, the class of service assigned to subscriber unit 26, the grade of service assigned to subscriber unit 26, the data or transmission rate of service assigned to subscriber unit 26, or any other suitable parameter. The quality error bit rate may be modified while subscriber unit 26 is within communication system 20 to reflect changing conditions such as noise, demand, connectivity, or any other suitable parameter. Applications providing services to subscriber unit 26 may adjust these services based on the quality error bit rate. For example, an application providing streaming audio and video may reduce the frame update rate as noise increases, guaranteeing successful transmission at a lower information rate. The information rate may be further reduced to provide only still pictures and audio if conditions continue to worsen. The information rate may also be automatically changed if subscriber unit 26 moves between coverage areas 24 with differing transmission capabilities or loads.

Control of the information rate may be achieved by having subscriber unit 26 monitor a signaling channel transmitted by access point 22 for each coverage area 24. This signaling channel informs subscriber unit 26 when to transmit information, how much information to transmit, the information transmission rate, and the like. The signaling channel may be controlled by a central supervisor, described below.

In an embodiment of the present invention, bandwidth on communication link 28 is only consumed when packets containing information are transmitted. For example, each subscriber unit 26 surrenders bandwidth on communication link 28 when not sending or receiving an information packet. Packets to be transmitted are queued based on order of arrival, priority, a combination of arrival order and priority, or the like. Subscriber unit 26 monitors a signaling channel transmitted by access point 22 for each coverage area 24. Subscriber unit 26 only consumes bandwidth when instructed to transmit by the signaling channel or when receiving packets.

Each access point 22 communicates with at least one distribution point 40. Distribution point 40 contains both routing and switching functionality. Access point 22 may be in contact with one or more radio access distribution points 40 over radio link 42, may be wired or cabled to distribution point 40 through wireline link 44, or may be packaged with distribution point 40. Access point 22 may also be transformed into distribution point 40, permitting access point 22 to route traffic that neither originated nor terminated with any of its serviced subscriber units 26. Distribution point 40 is in communication with at least one additional distribution point 40, the collection of interconnected distribution points forming a network of distribution points, shown generally by 41. Two distribution points may be connected by radio link 46 or wireline link 48.

Distribution points 40 may route packets within distribution point network 41 under a variety of protocols such as ATM, TCP/IP, 802.x, or the like. In a preferred embodiment, distribution point 40 includes an ATM/IP switch. Distribution point 40 then operates at both the IP routing and ATM switching layers or, in terms of the Open Systems Interconnection (OSI) standard, at both the network layer and the data link layer.

The IP layer operates with a link-state protocol such as the open shortest path first (OSPF), quality OSPF (Q-OSPF), or internal gateway routing protocol (IGRP) and its derivatives. The IP layer operates as a single autonomous system (AS) within the IP frame of reference. Each system 20 will be allocated a unique and unambiguous AS number for system management. IP addresses for system 20 will use a private IP address space that cannot be routed within public systems such as the Internet. Subscriber units 26 within system 20 may be permitted access to the private IP address space or may be excluded from the private IP address space. When private IP address space is used for subscriber units 26, a network address translator (NAT) within system 20 allows subscriber units 26 access to the Internet. The ATM layer operates with the private network node interface (PNNI) routing protocol. ATM end system addresses (AESAs), managed by the service provider for system 20, are used by distribution point network 41.

The ATM network carries voice traffic and may carry data. Through PNNI, the ATM/IP switch participates in switched or signaled virtual connections (SVCs). When subscriber unit 26 within system 20 requires voice connectivity, it signals such a request, which is serviced by distribution point 40 receiving that request. The IP network coresiding with the ATM network is used for delay insensitive data applications required by subscriber units 26. The IP network is also used for all network management, including management of ATM/IP switches, subscriber units 26, gear associated with distribution points 40, and any other suitable network component. This includes functions such as alarming, monitoring, recovery systems, and the like. While described in the context of a wireless network application, it is readily apparent that ATM/IP routing as described herein may be applied to wireline and mixed wireline-wireless systems as well.

Each distribution point 40 receives an information packet from either another distribution point 40, from subscriber unit 26 in communication with distribution point 40 through access point 22, or from an external communication system. If distribution point 40 determines the information packet is destined for subscriber unit 26 within coverage area 24 of access point 22 in communication with distribution point 40, distribution point 40 forwards the packet to access point 22 forming coverage area 24 containing destination subscriber unit 26. If distribution point 40 determines the information packet is destined for subscriber unit 26 in coverage area 24 formed by access point 22 in communication with a different distribution point 40, distribution point 40 forwards the packet to one of distribution points 40 in communication with distribution point 40. Hence, no central MSC is required for routing. Distributed routing removes delays caused by central switching, increases the robustness of the communication system 20, increases network efficiency, and permits simplified expansion or reduction of communication system 20 by automatically adding or removing distribution points 40.

A third option is that distribution point 40 determines that the information packet is destined for a destination not part of communication system 20. Special distribution points, such as gateway 50, provide a bridge to additional communication systems 52 including wireless and wireline telecommunication systems, video distribution systems, computer network systems such as the Internet, packet systems, frame systems, ATM systems, IP systems, private networks, and any other suitable communication or information system. If distribution point 40 determines the information packet is destined for delivery outside of communication system 20, distribution point 40 forwards the packet to one of distribution points 40 in communication with gateway 50.

In an embodiment of the present invention, communication system 20 includes communication system interface device 54 operative to format information contained in the information packet to pass through telecommunication system 52. Communication system interface device 54 may be incorporated into gateway 50 or may be a separate component of communication system 20. Distribution point 40 receives at least one information packet from the telecommunication system interface device 54 and determines if the at least one information packet destination is to subscriber unit 26 within coverage area 24 of access point 22 in communication with distribution point 40. Distribution point 40 forwards the at least one information packet to access point 22 defining coverage area 24 containing subscriber unit 26 if the information packet destination is to subscriber unit 26 within coverage area 24 of access point 22 in communication with distribution point 40 and forwards the at least one information packet to one of the additional distribution points 40 in communication with distribution point 40 otherwise.

Each distribution point 40 communicates with supervisor 56. Supervisor 56 tracks the locations of subscriber units 26 within communication system 20, identifying with which distribution point 40 each subscriber unit 26 is currently communicating. Supervisor 56 manages transmission priorities based on parameters including load, information type, service requests, location, grade of service, information transfer rates, or any other suitable parameter. Supervisor 56 may also serve as a collection point for alarms and performance measuring of communication system 20. Supervisor 56 may further include or interface with billing and authentication services.

In an embodiment of the present invention, supervisor 56 also assigns an address to each distribution point 40 as distribution point 40 is added to communication system 20. Supervisor 56 provides each distribution point 40 with a logical address and a listing indicating to which additional distribution point 40 in communication with distribution point 40 information packets should be forwarded for each possible destination distribution point 40 . The listing may be based on maintaining a minimum quality of service in the path through distribution point network 41 to the destination distribution point 40. Supervisor 56 periodically assesses the performance of network 41 by sending test messages. Reports may also be generated by distribution points 40 attempting to communicate with target addresses.

Supervisor 56 is shown in FIG. 1 as a separate component individually connected to each distribution point 40. Alternatively, communication between supervisor 56 and distribution points 40 may be through radio links 46 and wireline links 48. Supervisor 56 may be one or more separate components of communication system 20, may be incorporated into one of distribution points 40, or may be distributed amongst multiple distribution points 40.

In an embodiment of the present invention, a distribution point may be automatically added to or removed from distribution point network 41. When new distribution point 40 is first inserted into communication system 20, new distribution point 40 transmits a signature signal. Existing distribution points 40 within range of new distribution point 40 receive the signal and report it to supervisor 56. Supervisor 56 then determines if new distribution point 40 will be added to network 41. If so, supervisor 56 assigns new distribution point 40 a routing address and informs network 41 as needed. Each existing distribution point 40 in distribution point network 41 is provided with an indication as to which distribution point 40 in communication with existing distribution point 40 each information packet having a destination address specifying the new distribution point 40 is to be forwarded. If a distribution point 40 is removed from network 41, remaining distribution points 41 report the absence of removed distribution point 40 to supervisor 56. Supervisor 56 then informs network 41 as needed.

In an embodiment of the present invention, each subscriber unit 26 is autonomously registered with communication system 20 when subscriber unit 26 first enters coverage area 24 within communication system 20. Each subscriber unit 26 maintains registration as subscriber unit 26 moves from one coverage area 24 into another coverage area 24 within communication system 20 and is autonomously deregistered when subscriber unit 26 leaves communication system 20. To accomplish automatic registration and deregistration of subscriber units 26, each access point 22 periodically reports the status of subscriber units 26 within any controlled coverage area 24 to supervisor 56 performing registration and authentication. Each access point 22 communicates with subscriber units 26 to determine status. When a subscriber unit 26 voluntarily enters or leaves coverage area 24, such as by powering up or down, subscriber unit 26 transmits a particular signal to access point 22. Information is also received from subscriber unit 26 in response to periodic queries from network 20. Access point 22 may determine the absence of subscriber unit 26 from coverage area 24 if no communication is received after a particular time interval. Algorithms for registering and deregistering subscriber units 26 may be based on various factors including quality of service, traffic, location, service type, network topology, and the like.

Figure 2:
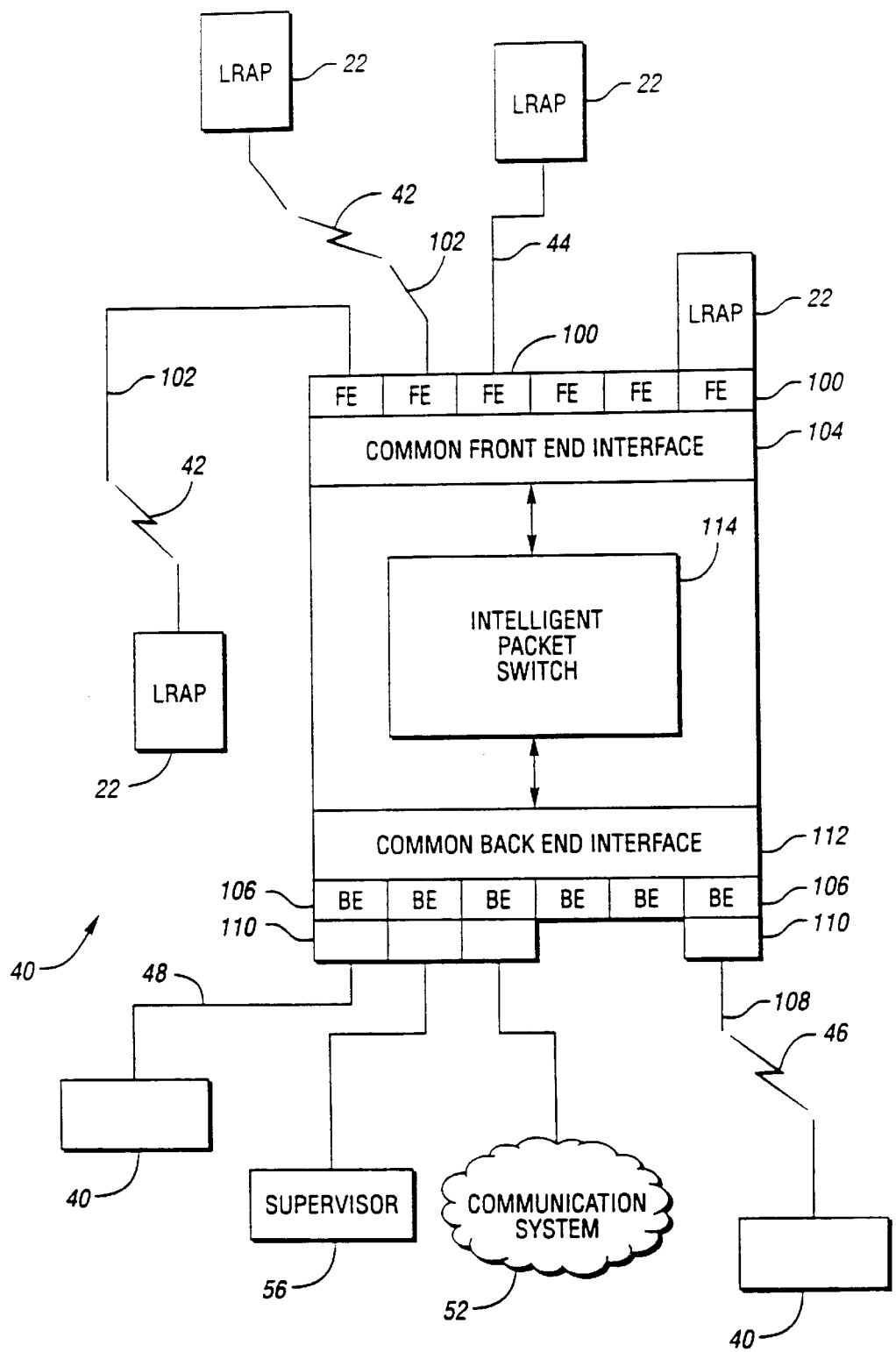
FIG. 2 is a block diagram of a distribution point according to an embodiment of the present invention.

Referring now to FIG. 2, a block diagram of a distribution point according to an embodiment of the present invention is shown. Distribution point 40 includes one or more front end communication interfaces 100, each front end interface communicating with one access point 22. In one configuration, access point 22 is packaged with distribution point 40. Front end interface 100 may provide a plug-in port for receiving access point 22. In another configuration, front end interface 100 connects to antenna 102 for establishing radio link 42 with access point 22. In a further configuration, front end interface 100 accepts wireline link 44 connecting distribution point 40 with access point 22. Front end interface 100 operates using a standard packet switching protocol such as, for example, ATM25. Each front end communication interface 100 passes information packets through common front end switch interface 104 operating under a packet protocol such as ATM, TCP/IP, 802.x, or the like.

Distribution point 40 also includes back end communication interfaces 106 for connecting distribution point 40 with additional distribution points 40, with supervisor 56, and, if distribution point 40 is a gateway 50, with telecommunication systems, private network systems, video distribution systems, the Internet, or the like. This may be typically referred to as backhaul communication. In one configuration of the present invention, back end interface 106 connects to antenna 108 for establishing radio link 46 with another distribution point 40. In another configuration, back end interface 104 accepts wireline link 44 connecting distribution point 40 with another distribution point 40. In a preferred embodiment, back end interface 106 accepts modules 110 for interfacing through a variety of protocols and media such as ATM25, DS1, DS3, OC3, 1000Base-T, 100Base-T, and the like. Each back end communication interface 106 passes information packets through common back end switch interface 112 operating under a packet protocol such as ATM, TCP/IP, or the like. In a preferred embodiment, distribution point 40 dynamically allocates bandwidth when the information packet is forwarded to one of the additional distribution points 40 in communication with distribution point 40.

Intelligent packet switch 114 received information packets through common front end switch interface 104 and common back end switch interface 112 and routes the packets between front end interfaces 100 and back end communication interfaces 106. Switch 114 may be a packet switching device as is known in the art such as an ATM switch, an IP switch, a TDM switch, a switch working under the 802.11 specification, or any other suitable alternative or combination having the required switching functionality. In an embodiment of the present invention, switch 114 includes an ATM portion for routing voice, video and data, and an IP portion for real-time dynamic data routing and non-real time data routing as well as administration, management, and network topology control.

In an embodiment of the present invention, elements of distribution point 40 are enclosed in at least one environmentally sealed package. This permits distribution point 40 to be mounted outside, such as on a pole or the side of a building. In keeping with the invention, however, distribution point 40 need not be outside so long as it can communicate with access points 22, additional distribution points 40, supervisor 56, and any other suitable network component.

Figure 3:
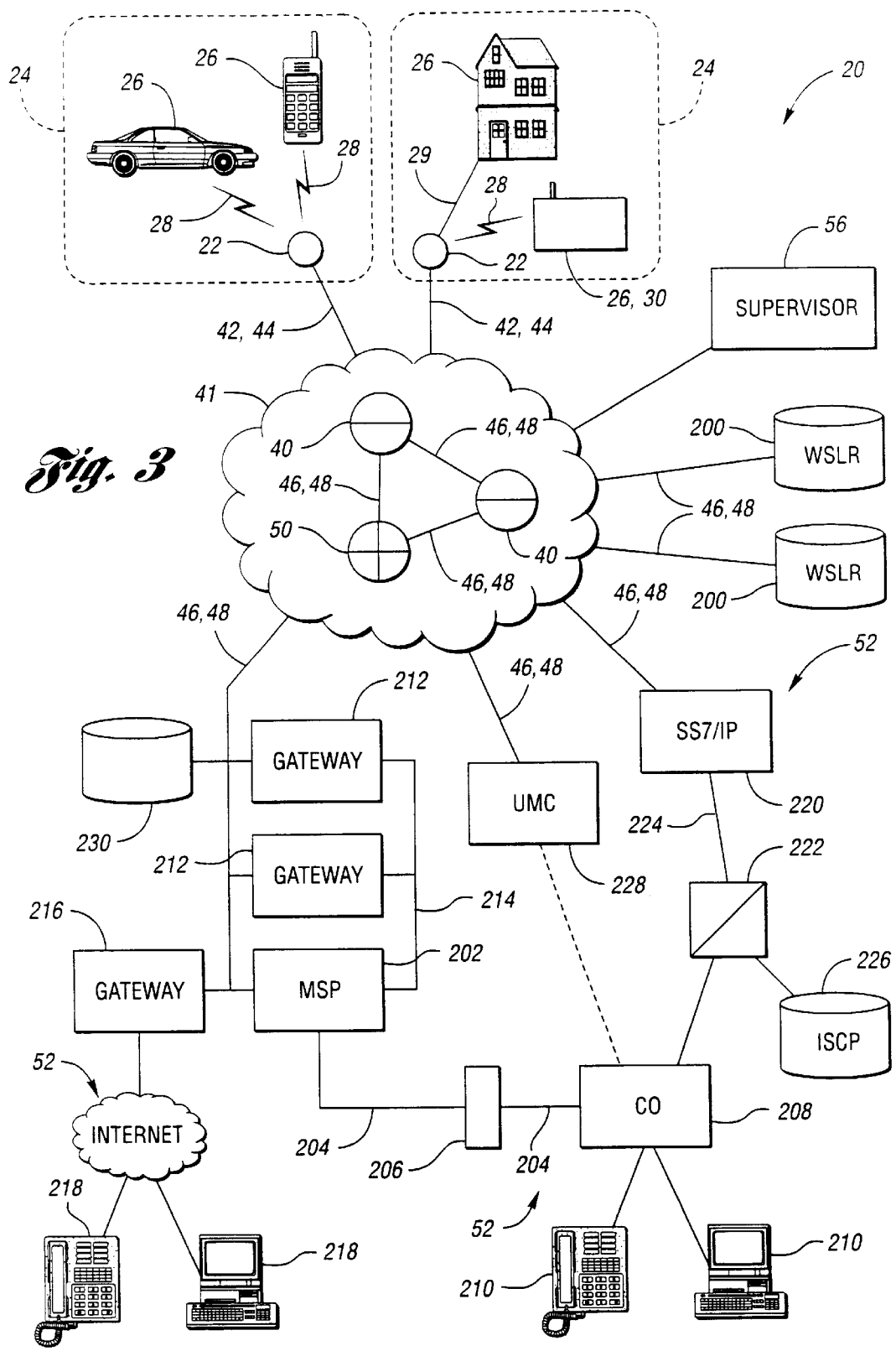
FIG. 3 is a schematic drawing illustrating an implementation of a communication system according to an embodiment of the present invention.

Referring now to FIG. 3, a schematic drawing illustrating an implementation of a communication system according to an embodiment of the present invention is shown. This implementation provides an example including interfaces between communication system 20 and a variety of external communication systems 52.

Communication system 20 includes wireless service location registers (WSLRs) 200 providing common subscriber and service databases. Each WSLR 200 communicates with at least one distribution point 40 and one additional communication system 52. Connections between WSLRs 200 and communication systems 52 are not shown in FIG. 3 for clarity. Each WSLR 200 provisions requested services from additional communication system 52. For example, WSLR 200 may provide centralized mobility and location management. Supervisor 56 determines which WSLR 200 will provision services based on the distribution point 40 through which subscriber unit 26 requesting services is currently communicating. A device that may serve as WSLR 200 is described in U.S. Pat. No. 5,974,331 titled "Method And System For Dynamically Assigning Features And Users To Wireline Interfaces," to Cook et al. and incorporated herein by reference. Call agents may also function as WSLR-like devices to map or integrate additional communication systems with system 20.

Communication system 20 may also include multi-service platform (MSP) 202. MSP 202 provides access to wireline telephone systems (PSTN). This may be accomplished through GR-303 compliant connection 204. Signaling point of interface (SPOI) 206 serves as the demarcation point between communication system 20 and external communication system 52. In the example shown, GR-303 connection 204 connects wireline provider 208, serving wired customers 210, with communication system 20. MSP 202 may integrate both PSTN and IP networks as well as provide enhanced circuit/packet switch services.

At least one gateway 212 supports MSP 202. Communication system 20 may include, for example, voice-over-ATM (VoATM) to GR-303 gateways and voice over IP (VoIP) to GR-303 gateways. Gateway 212 serves as a protocol agent, converting information packets to a format acceptable to additional communication system 52. A determination as to which gateway 212 will process an information packet may be based on information contained within the information packet. Gateways 212 may be connected to MSP 202 by GR-303 compliant connection 214.

Communication system 20 may also include gateway 216 connecting communication system 20 with external data network 52 such as the Internet or a private data network interconnecting network users 218. Gateway 216 may, for example, convert between various packet-based standards such as H.323 and SIP.

Communication system 20 may also include gateway 220 interfacing communication system 20 with external SS7 network 52 represented by signal transfer point (STP) 222. Gateway 220 communicates with STP 222 through ISUP compliant connection 224 which permits setting up and taking down trunk calls, calling party information services, call status, and any other suitable network function, by passing signaling information through SS7 network 52 to wireline provider 208 under the control of integrated services control point (ISCP) 226.

Communication system 20 may also include unified message center (UMC) 228. Unified messages, also known as integrated messages, permit messages from a variety of sources such as telephone, email, fax, reports, compound documents, or any other suitable information or communication device, to be summarized and presented on a single medium, such as a personal computer. Messages may even be translated from one media type to another. UMC 228 supports unified message applications within communication system 20. In an embodiment, UMC 228 communicates with wireline provider 208, permitting greater integration, flexibility and access to messages.

Connection controller 230 controls access to gateways 50, 202, 212, 216, 220, or any other suitable interface. For example, connection controller 230 may manage voice over ATM to GR-303 access, voice over IP to GR-303 access, H.323/SIP to Internet remote access, SS7 to IP access, and the like. Connection controller 230 may also support information rate adaptation including open application processor interfaces and robust application development platforms.

Figure 4:
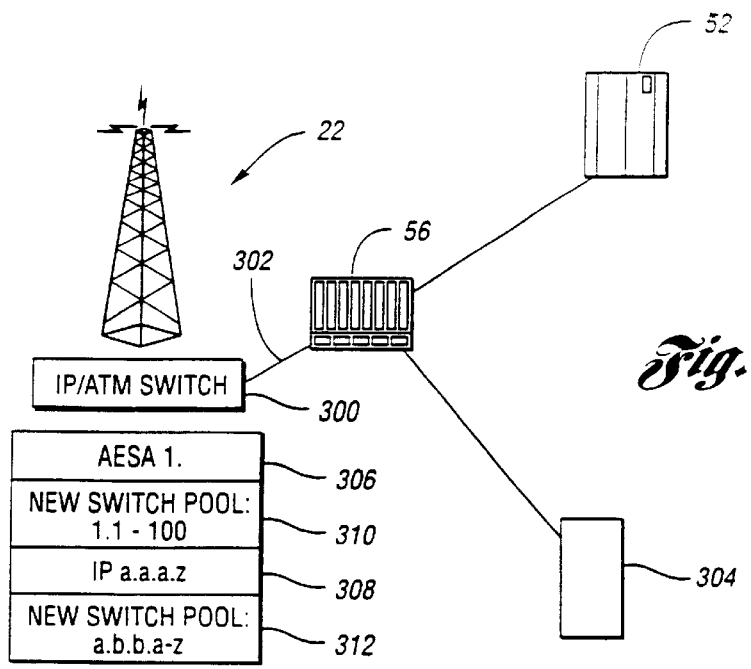
FIG. 4 is a schematic drawing illustrating an initial state for a communication system according to an embodiment of the present invention.
Figure 5:
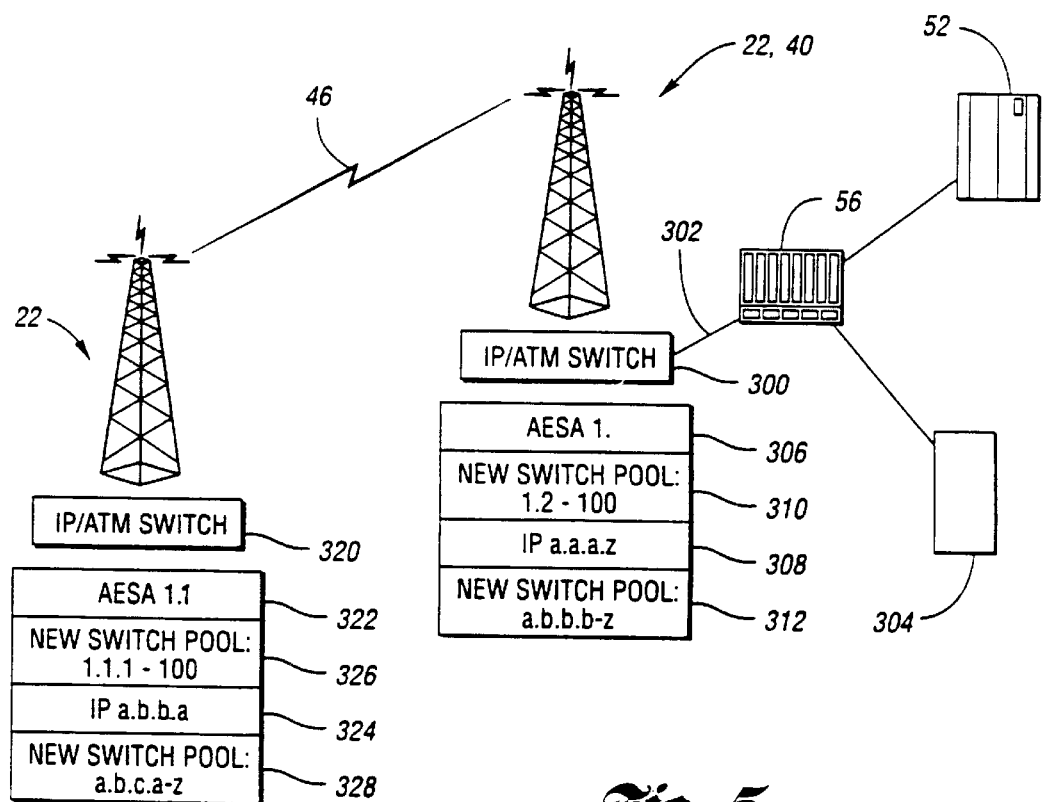
FIG. 5 is a schematic drawing illustrating the addition of a second access point to the communication system of FIG. 4 according to an embodiment of the present invention.
Figure 6:
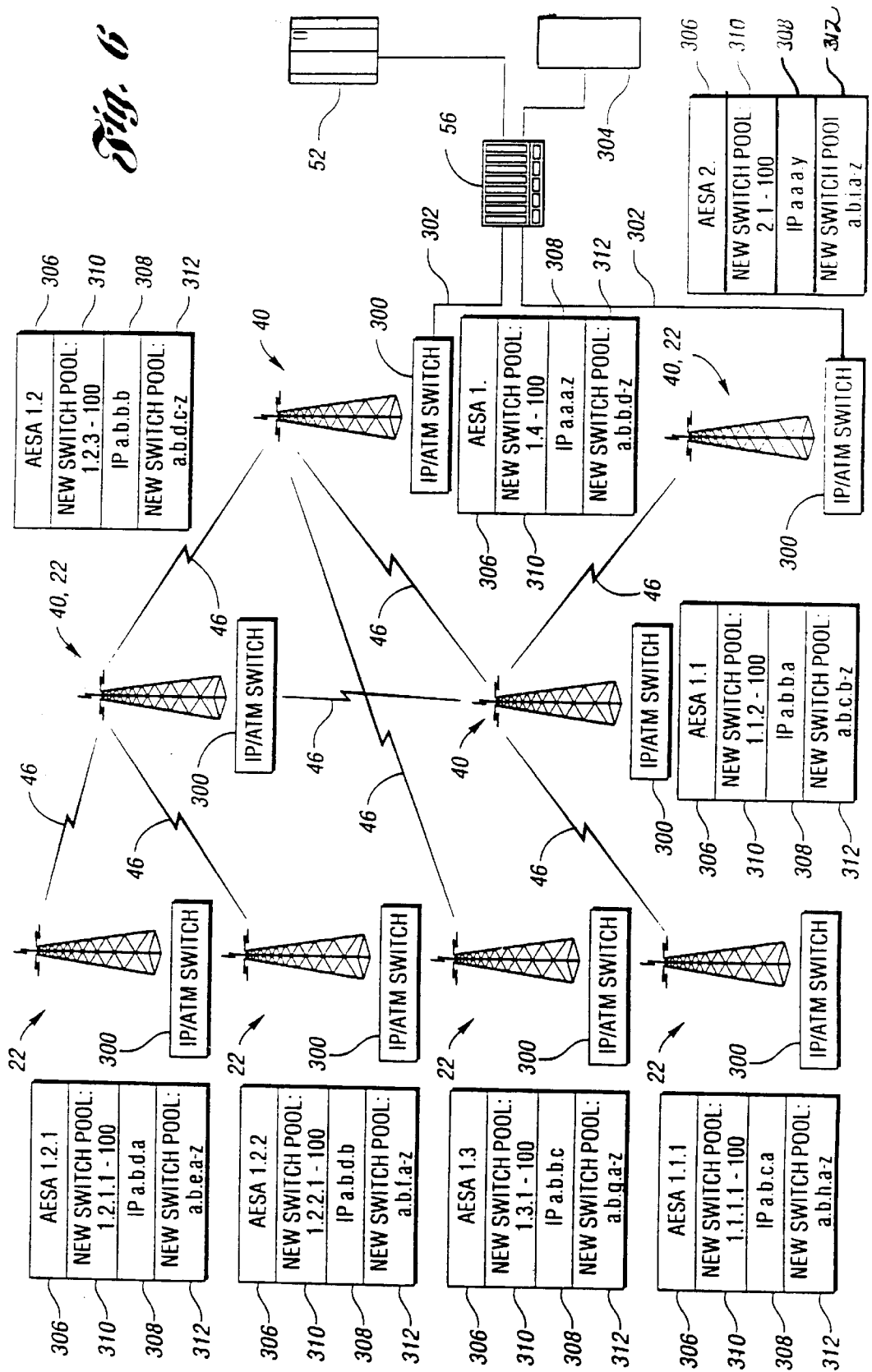
FIG. 6 is a schematic drawing illustrating a hierarchical routing system using ATM/IP switches according to an embodiment of the present invention.

Referring now to FIGS. 4–6, drawings illustrating dynamic growth of a distribution point network according to an embodiment of the present invention are shown. An initial configuration for system 20 is shown in FIG. 4. ATM/IP switch 300 is in communication with supervisor 56 through ATM virtual connection 302. In this simple configuration, ATM/IP switch 300 may be functioning as access point 22. ATM/IP switch 300 may obtain an IP address and an ATM address either manually or automatically.

ATM/IP switch 300 automatically requests addresses by first broadcasting an ATM request in an IP packet over virtual connection (VC) 302. Supervisor 56 forwards this request to address server 304. Address server 304 responds by allocating unique ATM end system addresses (AESA) 306 to the address assignment client in ATM/IP switch 300, which updates the ATM layer with new address 306. The address assignment client in ATM/IP switch 300 next requests from address server 304 an IP address, again using IP as the transport service over pre-existing ATM VC 302. Address server 304 forwards IP address 308 to ATM/IP switch 300. ATM/IP switch 300 then requests address pools for ATM and IP. Address server 304 responds by suppling AESA pool 310 and IP address pool 312. Pools of addresses 310, 312 are used by switch 300 when functioning as distribution point 40 in support of other distribution points 40 and access points 22.

Referring now to FIG. 5, a drawing illustrating the addition of a second access point is shown. Access point 22 has the capability to function as a distribution point 40. As new access points 22 are subtended from an existing access point 22, existing access point 22 becomes a distribution point 40. Each distribution point 40 continues to communicate with its initially connected distribution point 40 and with other distribution points 40 as they are provisioned. As new links 46, 48 between distribution points are created, distribution points 40 form peer relationships at both the ATM layer and the IP layer. Distribution points 40 are always peers at the IP and ATM layer, while access points 22 are clients of distribution points 40. As such, each ATM/IP switch 300 functions as a server when operating as distribution point 40 and as a client when operating as access point 22.

When new ATM/IP switch 320 is instantiated as access point 22, it will automatically request an ATM address in an IP packet address assignment request. This IP packet will be sent in an ATM frame over radio link 46 to IP/ATM switch 300 functioning as distribution point 40 using a pre-existing ATM VC. IP/ATM switch 300 will allocate unique ATM address 322 from AESA pool 310 and unique IP address 324 from IP address pool 312. ATM/IP switch 320 then sends a directed request to address server 304 and receives its own AESA pool 326 and IP address pool 328.

Referring now to FIG. 6, a hierarchical routing network is shown. Address server 304 assigns AESA pool 310 and IP address pool 312 as each ATM/IP switch 300 is added. By handling all requests for address pools 310, 312, address server 304 maintains a hierarchy of addresses for both ATM and IP layers. Address server 304 constructs routing tables for each ATM/IP switch 300 indicating to which directly connected ATM/IP switch 300 each incoming packet should be routed if the packet is not destined to subscriber unit 26 serviced by that ATM/IP switch 300. Thus, routing tables are cohesive, reflecting the view of communication system 20 seen by each ATM/IP switch 300. Address server 304 also constructs forward equivalency class (FEC) tables permitting ATM/IP switch 300 to route packages based on package contents. FECs can be seen as either the virtual path identifier (VPI) portion of the ATM VPI/VCI or as the entire VPI/VCI, and are enabled by the routing protocols at the IP and PNNI layers.

New routing elements are dynamically added to a network of routing elements by establishing a connection between the new routing element and an existing routing element in the network of routing elements. At least one address is assigned to the new routing element, each assigned address coming from a pool of addresses maintained at the existing routing element. At least one pool of addresses is issued to the new routing element. The one or more pool of addresses permitting the new routing element to dynamically add yet another new routing element to the network of routing elements.

In an embodiment of the present invention, a method of dynamically adding a routing element to a distributed communications includes establishing an ATM virtual connection with an existing distribution point already part of the communications network. An ATM end user address is requested from the existing distribution point. An ATM end user address is obtained from the existing distribution point, the ATM end user address allocated from a pool of ATM end user addresses in the existing distribution point. An IP address is requested from the existing distribution point. An IP address is obtained from the existing distribution point, the IP address allocated from a pool of IP addresses in the existing distribution point. Preferably, a pool of ATM end user addresses is requested and received from an address server. A pool of IP addresses is requested and received from the address server. An ATM end user address from the pool of ATM end user addresses and an IP address from the pool of IP addresses may be assigned to a new routing element requesting to be added to the communications network.

In an embodiment of the present invention, when a new distribution point is added to a network of distribution points, a connection is established between the new distribution point and at least one existing distribution point in the network of distribution points. A peer-to-peer relationship is formed at the OSI network layer between the new distribution point and the at least one existing distribution point. A peer-to-peer relationship is formed at the OSI data link layer between the new distribution point and the at least one existing distribution point.

In an embodiment of the present invention, when an access point is added to a network of distribution points, a connection is established between the access point and at least one existing distribution point in the network of distribution points. A client-server relationship is formed at the OSI network layer between the access point client and the at least one existing distribution point server. A client-server relationship is formed at the OSI data link layer between the access point and the at least one existing distribution point server.

In an embodiment of the present invention, when an ATM/IP switch 300 is removed from communication system 20, all of the addresses 306, 308 and address pools 310, 312 associated with the removed switch 300 are released. Addresses 306, 308 and address pools 310, 312 may be instantiated at distribution point 40 which originally supplied removed switch 300 with addresses 306, 308, may be sent to supervisor 56, or may be split with addresses 306, 308 returning to distribution point 40 and address pools 310, 312 returning to supervisor 56.

When subscriber unit 26 first enters communication system 20, it is detected and serviced by access point 22. Subscriber unit 26 is provided with one or more addresses, each address routable within at least the local hierarchy of ATM/IP switches 300. If subscriber unit 26 enters the range of a new access point 22, new access point 22 sends out a flooding FEC routing update for the ATM address of subscriber unit 26. Previously servicing access point 22 removes subscriber unit 26 from its own FEC upon receiving the FEC update. Any subsequent ATM packets received by previously servicing access point 22 are discarded.

When subscriber unit 26 changes access points 22, the IP routing portion of system 20 moves the IP address of subscriber unit 26 from one FEC class to another. Any IP packets remain untouched, with only a label or equivalence changed. In one embodiment, the label is the VPI portion of the VC. In another embodiment, multiprotocol label switching (MPLS) is used to provide an additional label. In either case, the IP address and virtual connection identifier (VCI) are retained.

Figure 7:
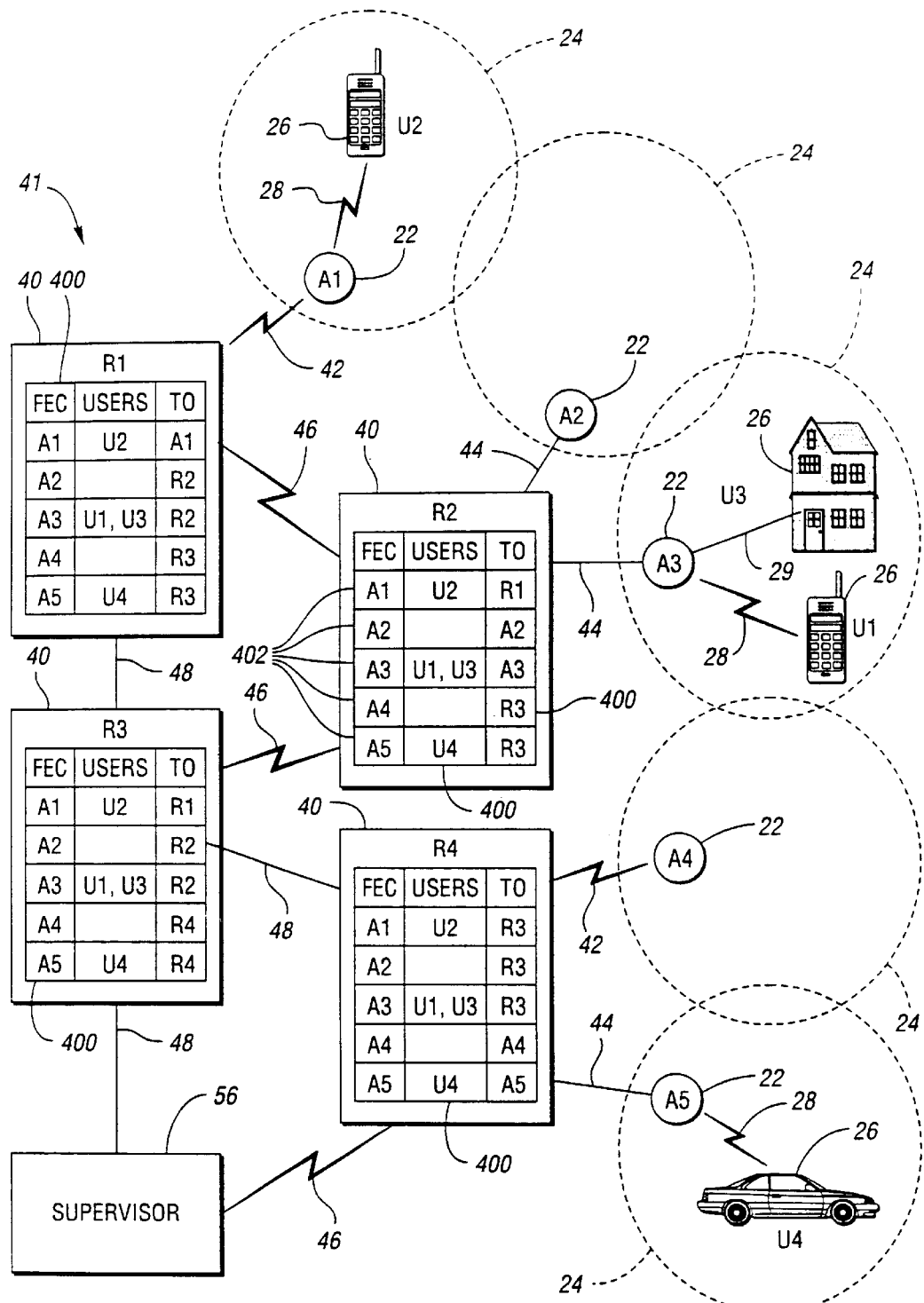
FIG. 7 is a schematic drawing illustrating a network of distribution points routing packets based on forward equivalency classes.

Referring now to FIG. 7, a schematic drawing illustrating a network of distribution points routing packets based on forwarding equivalency classes is shown. Each distribution point contains an FEC table 400 used to route packets received from and destined to subscriber units 26. Forwarding equivalency class table 400 contains one entry for each forwarding equivalency class 402. In the embodiment shown, there is one FEC 402 corresponding to each access point 22. When subscriber unit 26 is first detected by access point 22, the address for subscriber unit 22 is placed in the equivalency class 402 corresponding to the detecting access point 22. The address is typically an IP address. This may be done by broadcasting from detecting access point 22 or, preferably, is done by supervisor 56 after supervisor 56 receives a message indicating subscriber unit 26 has been detected by access point 22.

FEC table 400 in each distribution point 40 contains the next destination for each FEC 402. Typically, destinations are other distribution points 40, access points 22 serviced by distribution point 40, gateways 50, and other suitable points for routing, switching, servicing, distributing, and the like. When a packet destined for subscriber unit 26 is received by distribution point 40, distribution point 40 determines to which FEC subscriber unit 26 is assigned, determines to which destination the packets in that FEC are routed, and forwards the packet to the determined destination.

Figure 8:
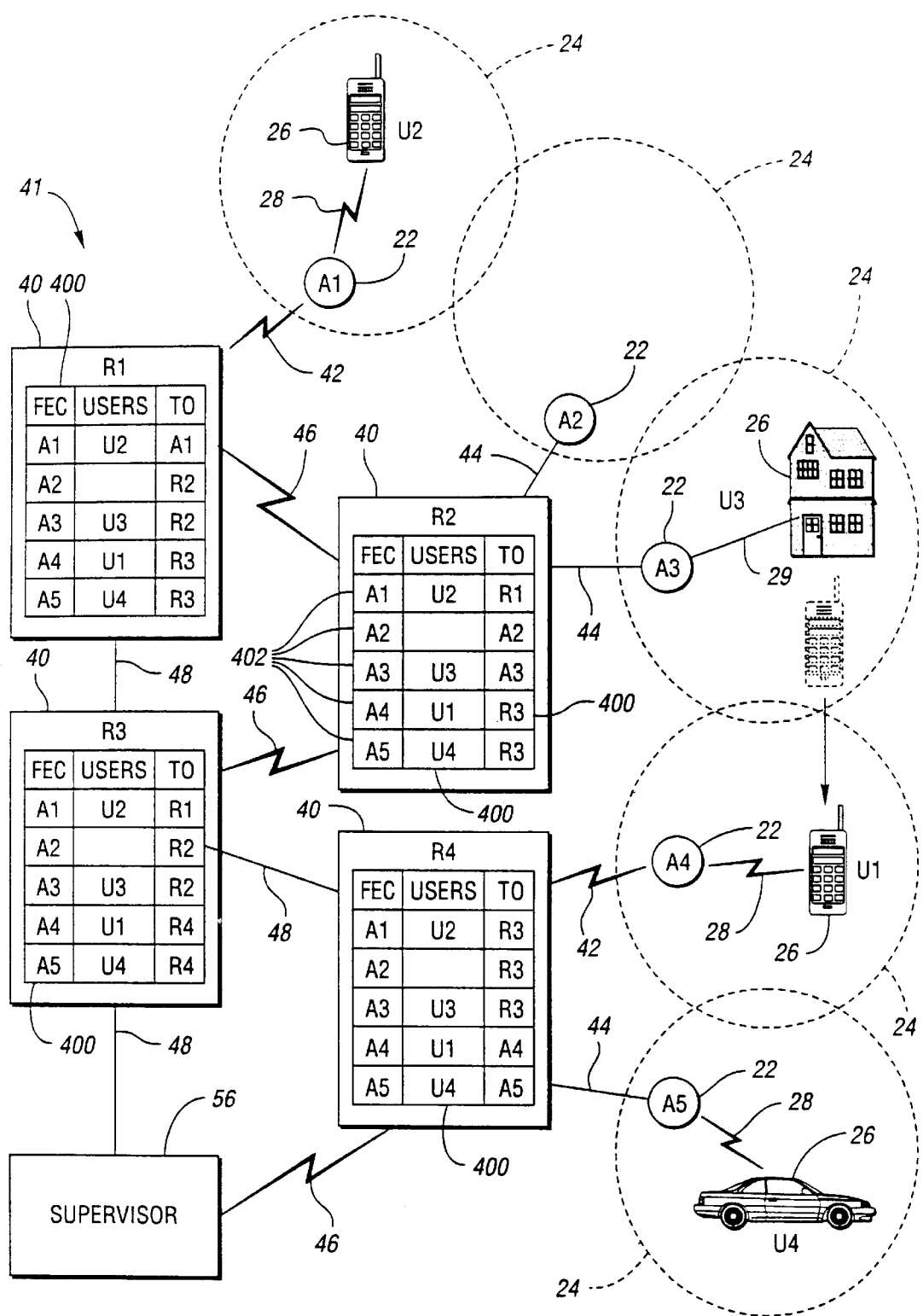
FIG. 8 is a schematic drawing illustrating forward equivalency class updating to track a moving subscriber unit.

Referring now to FIG. 8, a schematic drawing illustrating forwarding equivalency class updating to track a moving subscriber unit is shown. If subscriber unit 26 is mobile or portable, as indicated by U1 in FIG. 8, subscriber unit 26 may move out of coverage area 24 for one access point 22 and into coverage area 24 for a new access point 22. The address for subscriber unit 26 is then moved from FEC 402 of original access point 22 into FEC 402 for new access point 22. In an embodiment, when original access point 22 is no longer in communication with subscriber unit 26, original access point 22 broadcasts a message to distribution points 40 and supervisor 56. If original access point 22 subsequently receives any packets for subscriber unit 26, original access point forwards these packets back into distribution point network 41. If the packets are sequentially indicated, such as IP packets, correct order will be established by subscriber unit 26 when packets are received.

Figure 9:
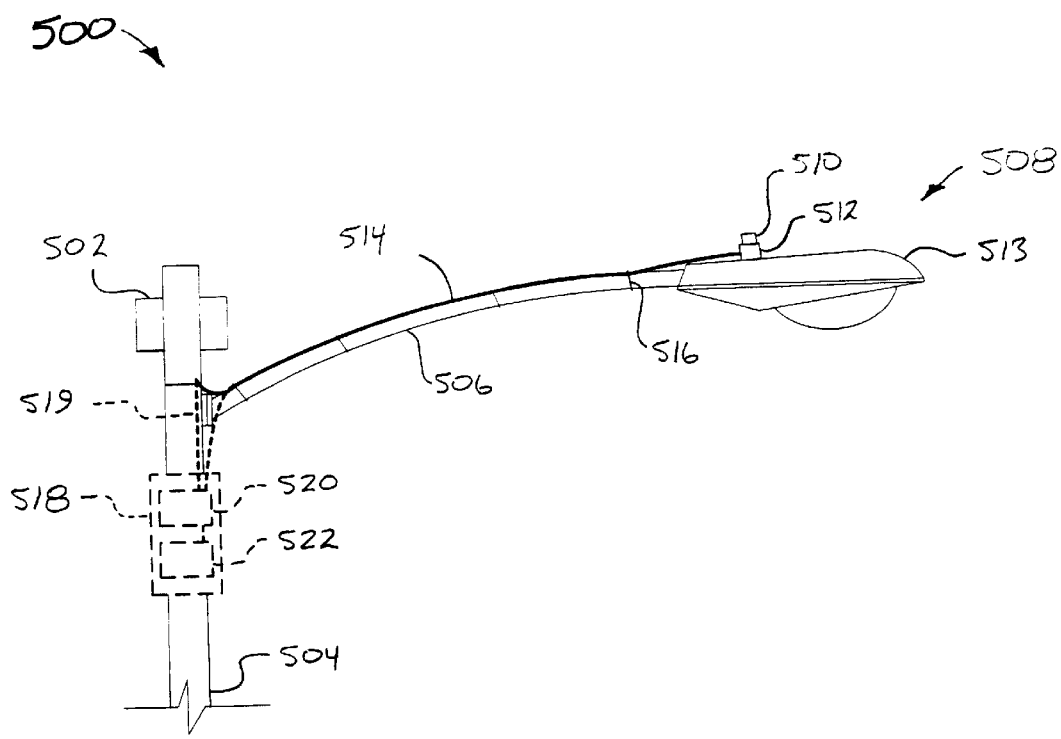
FIG. 9 is an elevation view drawing of a pole mounted antenna system powered according to an embodiment of the present invention.

Referring now to FIG. 9, an elevation view drawing of a pole mounted antenna system powered according to an embodiment of the present invention is shown. An antenna system, shown generally by 500, includes antenna module 502, having at least one wireless telecommunication antenna. Antenna module 502 is mounted on vertical pole 504, the top portion of which is shown in FIG. 9. Extension pole 506 extends from pole 504. A light system, shown generally by 508, is attached to the end of extension pole 506. Light system 508 includes a device for detecting ambient light level commonly known as electric eye 510. Electric eye 510 interrupts the flow of electricity to lighting elements in light system 508 when the level of ambient light exceeds a threshold and provides electricity to lighting elements in light system 508 when the level of ambient light falls beneath a threshold.

Power adapter 512, shown attached to light housing 513, is disposed between electric eye 510 and the remainder of light system 508. Power adapter 512 taps into the power supplied to light system 508 to provide electrical current through cabling 514 connected to power adapter 512. Cabling 514 runs along extension pole 506. Cabling ties or wire wraps, one of which is indicated by 516, hold cabling 514 to extension pole 506. In one embodiment of the present invention, cabling 514 is directly connected to antenna module 502.

In another embodiment of the present invention, cabling 514 connects to power box 518 mounted to light pole 502. Cabling 519 then connects power box 518 to antenna module 502. Power box 518 may contain several types of power support components. For example, power box 518 may include power conversion equipment such as transformers, voltage converters and the like, if the power supplied by light system 508 does not meet the requirements of antenna module 502. Such equipment may provide AC to DC conversion as well as voltage regulation. Power box 518 may also contain protection equipment such as fuses, isolators and lightning arresters to protect antenna module 502 and associated wiring and cabling. Power box 518 may further function as an uninterruptible power supply (UPS) by including charge/discharge circuit 520 and electrical storage device 522 such as, for example, one or more batteries. Charge/discharge circuit 520 charges electrical storage device 522 during periods when power is supplied from light system 508. If charge/discharge circuit 520 detects the loss of power from light system 508, charge/discharge circuit 520 draws power from storage device 522 to keep antenna module 502 in operation. The design and operation of systems suitable for charge/discharge circuit 520 and storage device 522 are well known.

Figure 10:
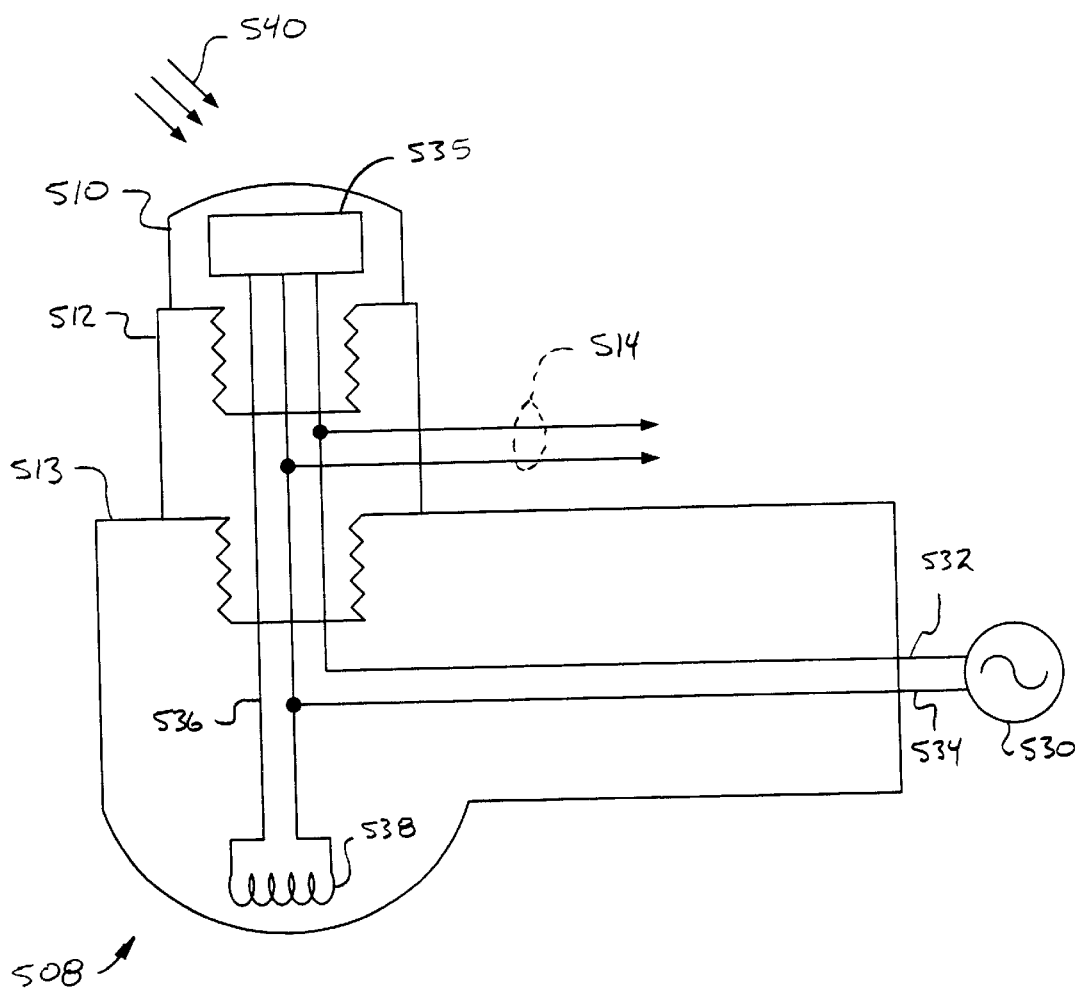
FIG. 10 is a schematic drawing of a street light control system with a power adapter according to an embodiment of the present invention.

Referring now to FIG. 10, a schematic drawing of a street light control system with a power adapter according to an embodiment of the present invention is shown. Light system 508 is powered by external AC source 530 through "hot" cable 532 and neutral cable 534. Electric eye 510 includes light control circuit 535 which switches current from hot cable 532 onto load wire 536 connected to light element 538 when the level of ambient light 540 striking electric eye 510 falls below a predetermined threshold. Power adapter 512, between electric eye 510 and the remainder of the light circuit in light system 508, taps into hot cable 532 and neutral cable 534 to provide power for antenna module 502 through cabling 514. Power adapter 512 includes a pass through for load wire 536.

The electrical construction for power adapter 512 requires three pass through connections for hot cable 532, neutral cable 534 and load wire 536. Two of the wires, hot cable 532 and neutral cable 534 are brought out for connection to cabling 514. Mechanically, power adapter 512 must fit into the opening in housing 513 for electric eye 510 and provide a mounting position for electric eye 510. Power adapter 512 must also provide an environmentally secure connection point or pass through for cabling 514. These mechanical constraints are met by the model N282TAPA twist lock timed auxiliary power adapter by Fisher Pierce of Weymouth, Mass. The N282TAPA inserts between an electrical eye and a street light housing to provide for the timed control of ornamental lighting.

While the embodiment illustrated in FIG. 10 outputs AC current through cabling 14, other embodiments are possible. For example, light control circuit 535 can be split into more than one modules, at least one of which is not contained within electric eye 510. Electric eye 510 may then only contain a photo sensor and sensor support electronics. In this case, the three wires passing through power adapter 512 would be a positive voltage wire, such as 40 volts DC, in place of hot cable 532, a ground wire in place of neutral cable 534, and a switched positive voltage wire as load wire 536. Power adapter 512 would then output the non-switched positive voltage and ground onto cabling 514.

Antenna module 502 may be installed in a variety of manners, depending on the construction of pole 504, antenna module 502 and light system 508. For example, antenna module 502 may be assembled prior to delivery at pole 504. A lift may be used to take antenna module 502 to the location on pole 504 to which it is to be mounted. After mounting antenna module 502, power adapter 512 is inserted between electric eye 510 and the remainder of the light circuit in light system 508 by first removing electric eye 510 from housing 513, installing power adapter 512 in the opening for electric eye 510, and installing electric eye 510 in power adapter 512. Cabling 514 is connected between power adapter 512 and antenna module 502. This requires only one trip up in the lift and no ground operations such as installing boxes or pedestals, burying cables, or the like. Hence, the cost of installing access points 22 is greatly reduced and the flexibility of communication system 20 is greatly increased.

Figure 11:
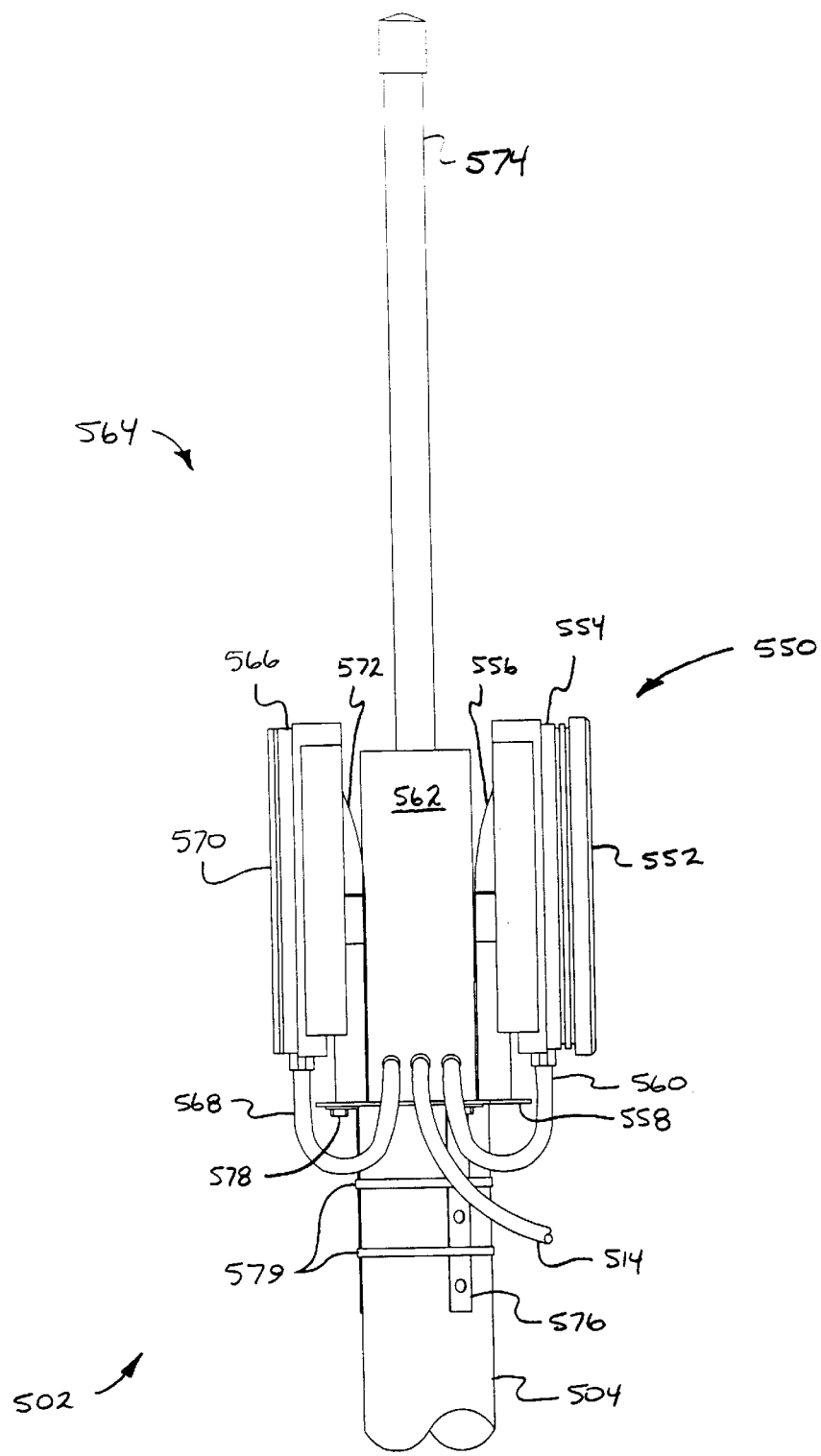
FIG. 11 is an elevation view drawing of an antenna system according to an embodiment of the present invention.

Referring now to FIG. 11, an elevation view drawing of an antenna system according to an embodiment of the present invention is shown. An antenna module, shown generally by 502, includes a backhaul system, shown generally by 550. Backhaul system 550 has backhaul antenna 552 attached to backhaul data terminal 554. Typically, backhaul antenna 552 is a directional antenna aimed at a corresponding antenna at another location. Backhaul mounting support 556 joins backhaul system 550 to base plate 558 affixed to pole 504. Backhaul mounting support 556 allows backhaul antenna 552 to be horizontally and elevationally angled to facilitate alignment of backhaul antenna 552.

Backhaul cable 560 connects backhaul data terminal 554 with junction box 562. Backhaul system 550 may be implemented with a UNII SU from Adaptive Broadband located of Sunnyvale, Calif.

Antenna module 502 also includes an access system, shown generally by 564. Access system 564 includes access data terminal 566 connected to junction box 562 through access cable 568. Directional access antenna 570 is attached to access data terminal 566 and may form a directional coverage area 24 for access point 22. Access data terminal 568 attaches to base plate 558 through access data terminal mounting support 572 which may be used to horizontally and elevationally aim directional access antenna 570. Preferably, antenna module 502 includes omnidirectional antenna 574 to form a substantially uniform, omnidirectional coverage area 24 around access point 22. The exact shape of coverage area 24 depends on a variety of factors including the type of antenna 574, frequency of transmission, local geography, and near by obstructions. Omnidirectional antenna 574 is connected to access data terminal 566 through cabling not shown. Access data terminal 566 may be implemented with a UNII SU from Adaptive Broadband. This unit may be modified for interconnection with omnidirectional antenna 574. In this manner, access point 22 may implement both omnidirectional and sectored coverage areas 24. Omnidirectional antenna 574 may be a model UNIIM-VR-11-360007-0S from Ball Wireless Communications Products of Broomfield, Colo.

Base plate 558 is attached to pole 504 by three L-brackets, one of which is indicated by 576. L-bracket 576 is held to base plate 558 by bolt 578. L-brackets 576 are held to pole 504 by straps 579 such as BAND-IT® straps available from Idex, Inc. of Denver, Colo.

Figure 12:
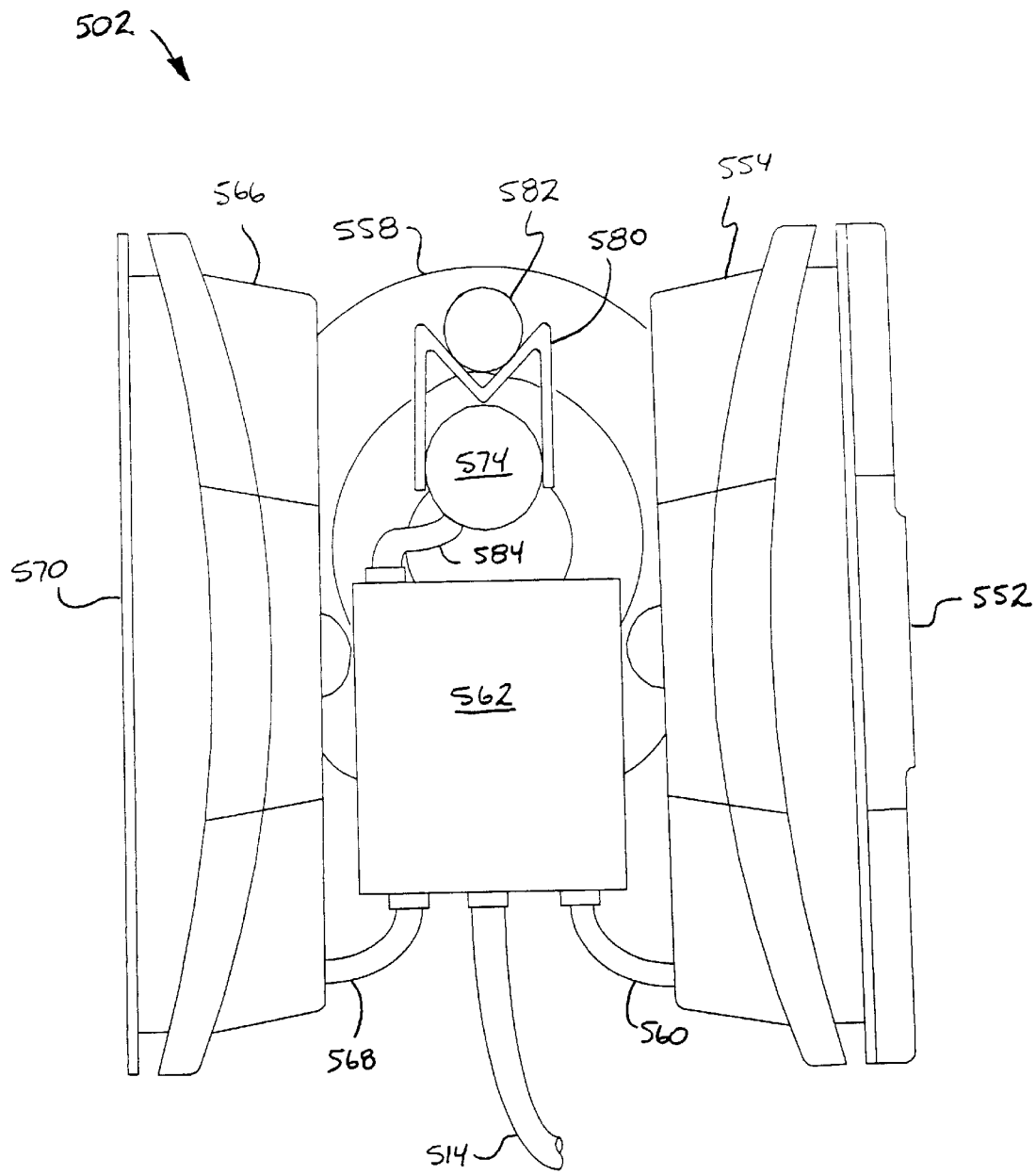
FIG. 12 is a plan view drawing of an antenna system having a single backhaul antenna according to an embodiment of the present invention.

Referring now to FIG. 12, a plan view drawing of an antenna system having a single backhaul antenna according to an embodiment of the present invention is shown. Omnidirectional antenna 574 is held in bracket 580 which is attached to base plate 558 by omnidirectional antenna mounting support 582. Omnidirectional antenna 574 is connected to junction box 562 through omnidirectional antenna cable 584. Junction box 562 provides environmental protection for connections between elements of antenna system 502 including between backhaul data terminal 554 and access data terminal 566 and between access data terminal 566 and omnidirectional antenna 574. Cabling 514 supplies electrical power to various elements of antenna system 502 through connections within junction box 562. In an embodiment of the present invention, access data terminal 566 is incorporated into junction box 562.

During operation, backhaul data terminal 554 formats baseband digital packetized information for transmission by backhaul antenna 552 and converts information received by backhaul antenna 552 into baseband digital information. Likewise, access data terminal 566 formats baseband digital packetized information for transmission by access antenna 570, 574 and converts information received by access antenna 570, 574 into baseband digital information. The frequencies and formats for transmission are based on regulatory requirements, frequency availability, data rates provided, noise, and other disturbances. Typical backhaul frequencies include 6, 11, 18 and 23 GHz licensed bands for DS3/OCS transmission and 5.8 and 24 GHz for unlicensed ATM-25 transmission. Typical frequencies for transmission by access antennas 570, 574 include 5.8 GHz and 700 MHz. Different frequencies for access transmission may simultaneously be used by access point 22 for omnidirectional and sectored coverage. For example, backhaul antenna 522 may operate at 23 GHz providing 579 Mbps peak data rate. Omnidirectional access antenna 574 may operate at 5.8 GHz providing 57.9 Mbps peak data rate to fixed and portable subscriber units 26 such as terminal network controllers 30. A plurality of directional access antennas 570 may operate at 700 MHz providing 2.4 Mbps data rate per sector to portable subscriber units 26 such as wireless telephones.

Figure 13:
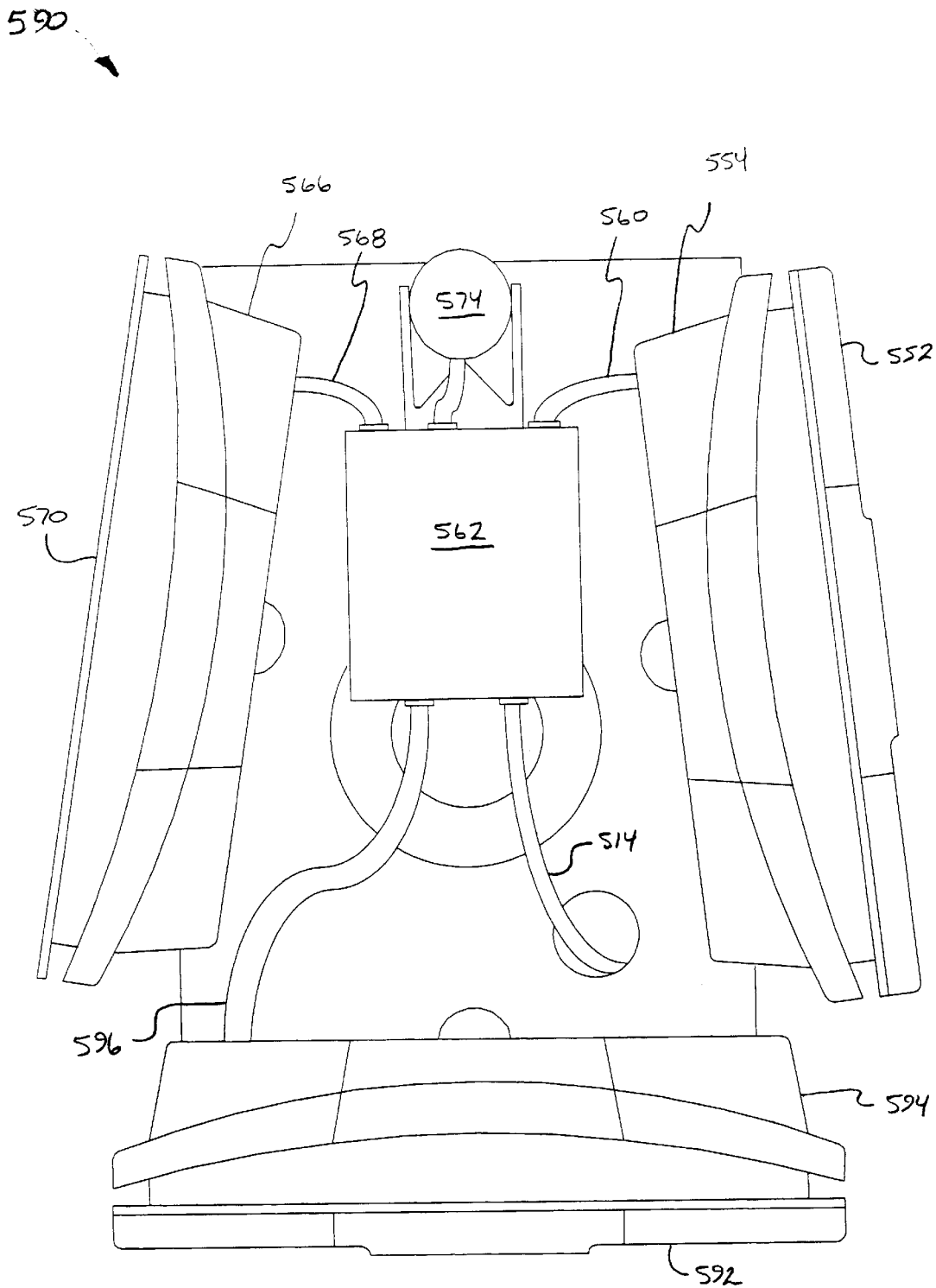
FIG. 13 is a plan view drawing of an antenna system having two backhaul antennas according to an embodiment of the present invention.

Referring now to FIG. 13, a plan view drawing of an antenna system having two backhaul antennas according to an embodiment of the present invention is shown. An antenna system, shown generally by 590, implements a combined access point 22 and distribution point 40. Antenna system 590 includes first backhaul antenna 552 with associated data terminal 554 connected to junction box 562 by backhaul cable 560 and second backhaul antenna 592 with backhaul data terminal 594 connected to junction box 562 by backhaul cable 596. Junction box 562 now includes common front end interface 104 interfacing access data terminal 566, common back end interface 112 interfacing backhaul data terminals 554, 594, and intelligent packet switch 114. If an information packet received by antenna system 590 is destined for subscriber unit 26, 30 communicating with access point 22 through antenna 570, 574, the packet is routed to access data terminal 566. If an information packet is not destined for subscriber unit 26, 30 communicating with access point 22 through antenna 570, 574, the information packet is routed to the appropriate backhaul data terminal 554, 594 based on the destination for the information packet.

Many variations fall within the spirit and scope of the present invention. For example, antenna system 590 may be modified to function solely as distribution point 40 or may function as a repeater to extend the range of communication system 20. Also, multiple directional access antennas 570 may be included in access point 22 to provide geographic diversity. The number and types of antennas 552, 570, 574, 592 may be adapted to the requirements of communication system 20 including data rates, access frequencies, backhaul frequencies, regulations, mounting structures, noise, obstructions, disturbances, and the like. Antennas 552, 570, 574, 592 and support equipment may be mounted in a single assembly, as a partial assembly, or singularly on pole 504. Further, omnidirectional access antenna 574 may be implemented with a plurality of directional antennas, such as directional access antennas 570, with each broadcasting the same information to achieve a substantially uniform coverage area 24.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A wireless communication antenna system mounted on a light pole, the light pole supporting at least one light powered by a light circuit, the light circuit controlled by an electric eye, the system comprising:

a power adapter disposed between the electric eye and the light circuit;

an antenna module mounted to the light pole, the antenna system having at least one antenna; and at least one electrical cable interconnecting the power adapter and the antenna module.

2. A wireless communication antenna system mounted on a light pole as in claim 1 further comprising:
   a charge/discharge circuit connected by the at least one electrical cable between the power adapter and the antenna module; and
   at least one electrical storage device connected to the charge/discharge circuit.

3. A wireless communication antenna system mounted on a light pole as in claim 1 wherein the antenna module comprises:
   at least one access antenna communicating with subscriber units; and
   at least one backhaul antenna.

4. A wireless communication antenna system mounted on a light pole as in claim 3 wherein the at least one backhaul antenna is a plurality of backhaul antennas, the antenna module further comprising an intelligent packet switch routing information between the backhaul antennas and the at least one access antenna.

5. A wireless communication antenna system mounted on a light pole as in claim 3 wherein the at least one access antenna comprises at least one omnidirectional radio antenna.

6. A wireless communication antenna system mounted on a light pole as in claim 1 wherein the antenna module implements a radio repeater.

7. A method for installing a pole mounted antenna module, the pole supporting a light automatically controlled by a light circuit having as an input an electric eye, the method comprising:
   mounting the antenna module at an elevated location along the pole;
   inserting a power adapter in between the electric eye and the remainder of the light circuit; and
   interconnecting the power adapter and the antenna module.

8. A method for installing a pole mounted antenna module as in claim 7 further comprising installing a power backup unit between the power adapter and the antenna module.

9. A method for installing a pole mounted antenna module as in claim 7 wherein mounting the antenna module comprises:
   mounting at least one access antenna for communication with wireless subscriber units; and
   mounting at least one backhaul antenna.

10. A method for installing a pole mounted antenna module as in claim 9 wherein the at least one backhaul antenna is a plurality of backhaul antennas, the method further comprising mounting an intelligent packet switch routing information between the backhaul antennas and the at least one access antenna.

11. A method for installing a pole mounted antenna module as in claim 9 wherein the at least one access antenna comprises at least one omnidirectional radio antenna.

12. A method of supplying power to a pole mounted antenna module comprising drawing current from a power adapter inserted between an electric eye and a light circuit controlled by the electric eye, the light circuit providing power to a light.

13. A method of supplying power to a pole mounted antenna module as in claim 12 further comprising charging a power backup unit with the current drawn from the power adapter and supplying current from the power backup unit to the antenna module if power is cut off from the electric eye.

14. A method of supplying power to a pole mounted antenna module as in claim 12 wherein the antenna module comprises:
   at least one access antenna communicating with subscriber units; and
   at least one backhaul antenna.

15. A wireless communication system interconnecting a plurality of wireless subscriber units, the wireless communication system providing a plurality of access points, each access point including at least one access antenna for establishing a wireless link with at least one subscriber unit, at least one access point comprising an antenna module containing the at least one access antenna, the antenna module mounted on a light pole, the light pole supporting at least one light powered by a light circuit, the light circuit controlled by an electric eye, wherein a power adapter is disposed between the electric eye and the light circuit, at least one electrical cable interconnecting the power adapter and the antenna module to provide electrical power to the antenna module.

16. A wireless communication system as in claim 15 wherein the access point further comprises:
   a charge/discharge circuit connected by the at least one electrical cable between the power adapter and the antenna module; and
   at least one electrical storage device connected to the charge/discharge circuit.

17. A wireless communication system as in claim 15 wherein the antenna module further comprises at least one backhaul antenna.

18. A wireless communication system as in claim 17 wherein the at least one backhaul antenna is a plurality of backhaul antennas, the antenna module further comprising an intelligent packet switch routing information between the backhaul antennas and the at least one access antenna.

19. A wireless communication system as in claim 15 wherein the at least one access antenna comprises at least one omnidirectional radio antenna.

20. A wireless communication system as in claim 15 wherein the at least one access antenna comprises a repeater antenna.

* * * * *